March 22, 1927.
G. M. ANDERSON
1,621,863
METHOD OF MARKING SHREDDED WHEAT BISCUIT
Original Filed May 17, 1918
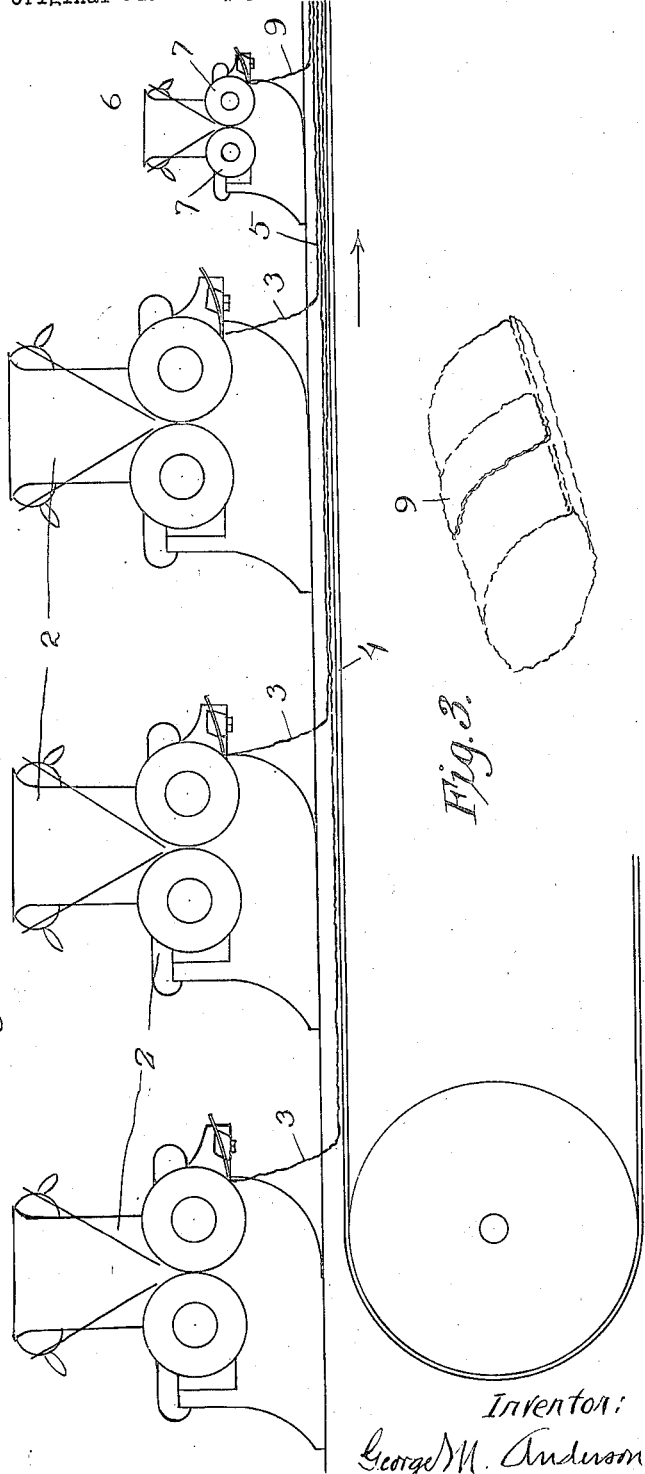
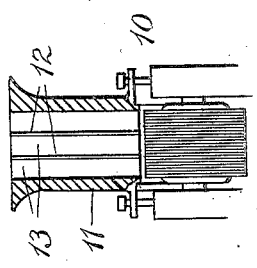
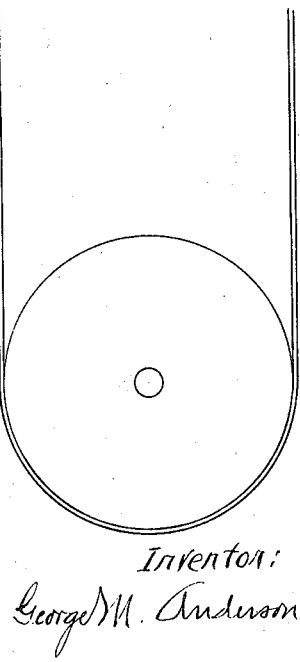
Inventor:
George M. Anderson.

Patented Mar. 22, 1927.

1,621,863

UNITED STATES PATENT OFFICE.

GEORGE M. ANDERSON, OF WASHINGTON, DISTRICT OF COLUMBIA, ASSIGNOR TO THE SHREDDED WHEAT COMPANY, A CORPORATION OF NEW YORK.

METHOD OF MARKING SHREDDED WHEAT BISCUIT.

Application filed May 17, 1918, Serial No. 235,144. Renewed August 3, 1926.

Figure 1 is a diagrammatic view of a means for carrying out the invention.

Figure 2 is a perspective view of the product.

Figure 3 is a diagrammatic sectional view of a shredding machine, showing a modified means for carrying out the invention.

The invention has relation to a method of superficially marking shredded wheat biscuit, with the idea of distinguishing the product, or to denote origin of the biscuit, and it consists in the novel construction and combinations of parts, as set forth in the appended claim.

In the accompanying drawings, illustrating a preferred means for carrying out the invention, the numeral 2 designates a gang of shredding machines, laying down bands 3 of cereal material upon a moving carrier or belt 4, the band 5, made up of the several superposed layers, being of the thickness of the biscuit, and suitably divided or cut transversely into biscuit form all as disclosed in the prior art, for instance in the patents to H. D. Perky, 681,656, dated August 27, 1901, for continuous cutting machine, and F. Regnier, No, 1,027,762, dated May 28, 1912, for grain shredding machine.

At one end of the gang of shredding machines a shredding machine 6 is provided, shown as of smaller size than the machines 2, and the rollers 7 of which are of the usual character.

The narrow band of shredded material 9, laid down from the machine 6 upon the top of the composite band 5 for the biscuit proper, is designed to be of the thickness of one shred only, and will not materially or appreciably increase the thickness of the biscuit, which can be packed as usual, with no appreciable increase in weight.

This narrow band 9 of shredded material is suitably colored, for instance by chocolate or annatto, mixed with the grain fed to the hopper of the shredding machine 6, and will be easily recognized, contrasting with the color of the top of the biscuit, and the edibility of the biscuit being in no way impaired thereby. This transverse band 9 appears as a hump or projection embossed or in relief upon the top of the biscuit.

A modification of the invention consists in providing a biscuit the top layer of which is of the usual dimensions, but particolored, having one transverse portion, as the central portion thereof, suitably colored before being laid down as stated, and the balance, or the transverse side portions, of natural color, the advantage being that a shredding machine having rolls of full size may be employed, and further in that the resulting product will be of the customary form, having no unusual protuberances or projections upon its top surface.

A means for carrying out this modification involves the use at one end of the gang of shredding machines of a shredding machine 10, the hopper 11 of which is divided by suitable partitions 12 into two or more chambers 13, into one of which grain suitably colored is fed, and into the other or others of which grain of natural color is fed.

I claim:

A method of making and simultaneously distinctively marking shredded cereal biscuit, consisting in laying down superposed bands of shredded cereal to form a composite band of the proper thickness, treating cereal material with a coloring agent and laying down from the same a distinctively colored top band upon said composite band and finally dividing the composite band and said top band transversely to form biscuit.

In testimony whereof I affix my signature.

GEORGE M. ANDERSON.